(12) United States Patent
Kato

(10) Patent No.: US 7,283,186 B2
(45) Date of Patent: Oct. 16, 2007

(54) LIQUID CRYSTAL DISPLAY

(75) Inventor: Yoshifumi Kato, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 10/356,230

(22) Filed: Jan. 31, 2003

(65) Prior Publication Data

US 2003/0142246 A1 Jul. 31, 2003

(30) Foreign Application Priority Data

Jan. 31, 2002 (JP) ............................. 2002-023307

(51) Int. Cl.
*G02F 1/1335* (2006.01)
(52) U.S. Cl. .................................. 349/61; 349/69
(58) Field of Classification Search .............. 349/69, 349/61; 315/169.3
See application file for complete search history.

(56) References Cited

U.S. PATENT DOCUMENTS

| | | | | |
|---|---|---|---|---|
| 5,377,027 A | * | 12/1994 | Jelley et al. | 349/69 |
| 5,760,858 A | | 6/1998 | Hodson et al. | |
| 5,796,382 A | * | 8/1998 | Beeteson | 345/102 |
| 6,008,871 A | * | 12/1999 | Okumura | 349/61 |
| 6,111,560 A | | 8/2000 | May | 345/102 |
| 6,114,183 A | * | 9/2000 | Hamada et al. | 438/29 |
| 6,556,260 B1 | * | 4/2003 | Itou et al. | 349/69 |
| 6,628,068 B1 | * | 9/2003 | Rorison et al. | 313/504 |

FOREIGN PATENT DOCUMENTS

| | | |
|---|---|---|
| JP | 62-206522 | 9/1987 |
| JP | 64-500302 | 2/1989 |
| JP | 06-110033 | 4/1994 |
| JP | 07-146467 | 6/1995 |
| JP | 10-078582 | 3/1998 |
| JP | 10-189237 | 7/1998 |
| JP | 11-160704 | 6/1999 |
| JP | 2000-267097 | 9/2000 |
| KR | 1998-024347 | 6/1998 |
| KR | 1998-086305 | 12/1998 |
| WO | WO99/50817 | 10/1999 |

OTHER PUBLICATIONS

German Office Action dated Jun. 5, 2007, received in corresponding German Patent Application No. 103 03 768.3-51 with English translation.

* cited by examiner

*Primary Examiner*—David Nelms
*Assistant Examiner*—David Y. Chung
(74) *Attorney, Agent, or Firm*—Morgan & Finnegan, L.L.P.

(57) ABSTRACT

A liquid crystal display includes a liquid crystal panel, which has a plurality of pixel rows, and a backlight located at the rear of the liquid crystal panel. The backlight includes a plurality of thin-film organic electroluminescent elements. Each organic electroluminescent element flashes independently from the other organic electroluminescent elements. Each electroluminescent element corresponds to one of the pixel rows and radiates light toward the corresponding pixel row. This structure reduces thickness and power consumption of the liquid crystal display.

17 Claims, 2 Drawing Sheets

1

LIQUID CRYSTAL DISPLAY

BACKGROUND OF THE INVENTION

The present invention relates to a liquid crystal display, and more specifically, to a liquid crystal display that uses a thin-film self-luminous body as a backlight.

Liquid crystal displays are widely used as displays for portable devices and the like. There is a strong need for reducing size, weight, and power consumption of such portable devices. Accordingly, a liquid crystal display is also required to reduce thickness and power consumption.

A high reflective liquid crystal display is employed for reducing power consumption. However, the image quality is insufficient. To guarantee a sufficient image quality, a transmissive liquid crystal display (including a semi-transmissive liquid crystal display) that uses a backlight is superior. A typical liquid crystal display is equipped with a cold cathode tube and an optical waveguide as a backlight. Also, a self-luminous body such as an organic electroluminescent (EL) element has been proposed to be used as a backlight.

Although the backlight that has a cold cathode tube and an optical waveguide ensures sufficient image quality, the thickness of the liquid crystal display, the size of the entire display, or the power consumption is increased. On the other hand, when the organic EL element is used, the problem concerning the thickness is solved but the power consumption is not reduced.

SUMMARY OF THE INVENTION

Accordingly, it is an objective of the present invention to provide a liquid crystal display that reduces the thickness and the power consumption.

To achieve the above objective, the present invention provides a liquid crystal display. The display includes a liquid crystal panel and a backlight. The liquid crystal panel has a plurality of pixels. The backlight is located at the rear of the liquid crystal panel and includes a plurality of thin-film self-luminous bodies, each of which flashes independently from the other self-luminous bodies. Each self-luminous body corresponds to at least one of the pixels and radiates light toward the corresponding pixel.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 and 2.

Figure 1:
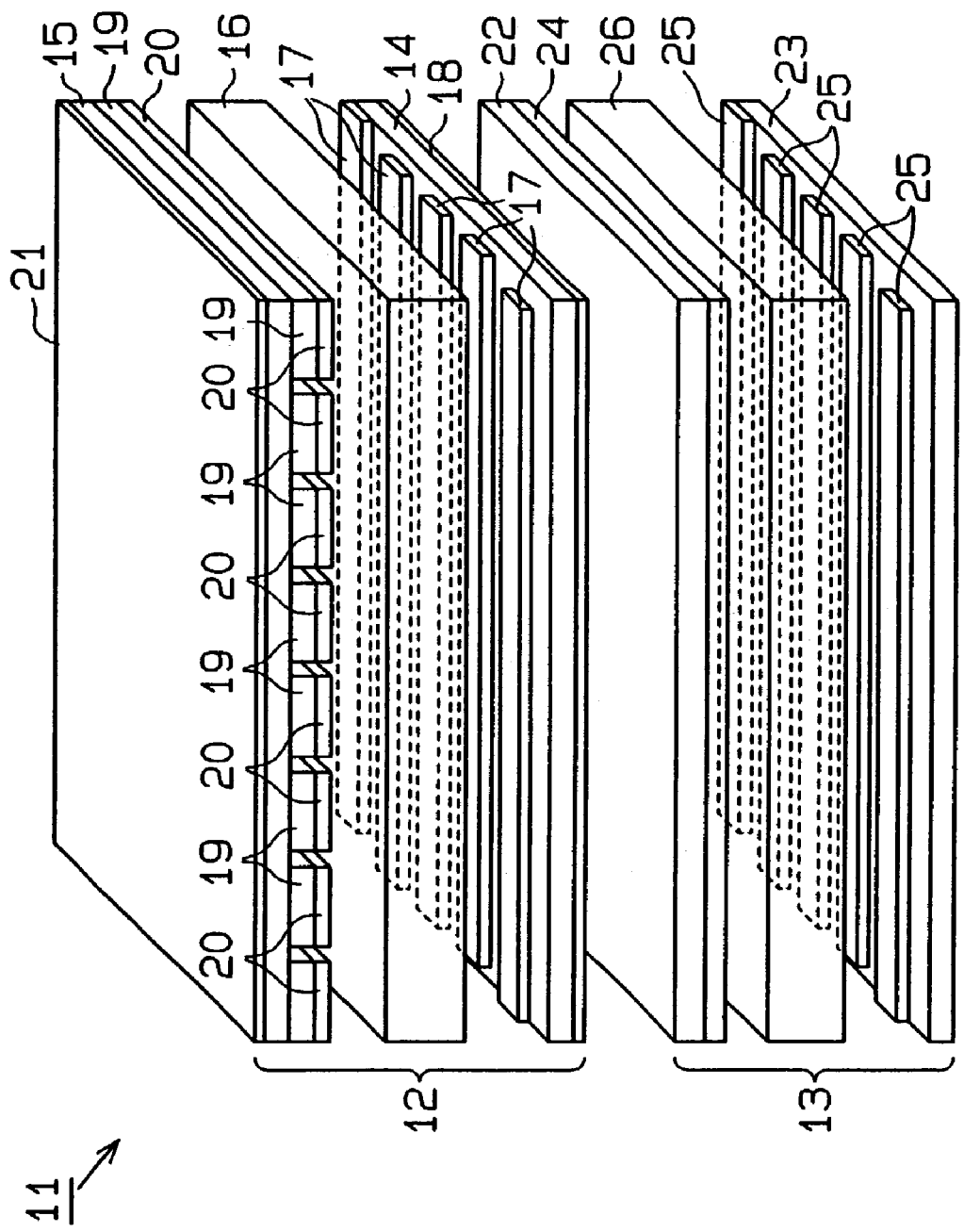
FIG. 1 is a schematic exploded perspective view illustrating part of a liquid crystal display according to a preferred embodiment of the present invention.

As shown in FIG. 1, a transmissive liquid crystal display 11 includes a passive-matrix type liquid crystal panel 12 and a backlight 13. The backlight 13 is located at the rear of the liquid crystal panel 12.

The liquid crystal panel 12 has a pair of transparent substrates 14, 15. The substrates 14, 15 are adhered to each other by a sealing material, which is not shown, with a predetermined space provided in between. A liquid crystal 16 is located between the substrates 14, 15. The substrates 14, 15 are made of glass. Transparent scanning electrodes 17 are located on the substrate 14 that is located on the side of the backlight 13. The scanning electrodes 17 are arranged on one of the surfaces of the substrate 14 that faces the liquid crystal 16 and are arranged parallel to each other. A polarizing plate 18 is formed on the other surface of the substrate 14 that is opposite to the liquid crystal 16.

Color filters 19 are formed on one of the surfaces of the other substrate 15 that faces the liquid crystal 16. A transparent data electrode 20 is formed on each color filter 19. The color filters 19 and the data electrodes 20 are perpendicular to the scanning electrodes 17. Another polarizing plate 21 is formed on the other surface of the substrate 15 that is opposite to the surface on which the data electrodes 20 are formed. The scanning electrodes 17 and the data electrodes 20 are formed of indium-tin oxide (ITO). Portions of the liquid crystal 16 located at the intersecting portions of the scanning electrodes 17 and the data electrodes 20 serve as pixels. In other words, each pixel is formed at the intersecting portion of one of the scanning electrodes 17 and one of the data electrodes 20. Each pixel is activated in accordance with voltage applied to the corresponding scanning electrode 17 and the corresponding data electrode 20. The pixels are divided into pixel rows, the number of which is the same as that of the scanning electrodes 17. Each pixel row is formed of pixels arranged along the lengthwise direction of the scanning electrodes 17.

The backlight 13 includes a pair of transparent substrates 22, 23. A transparent electrode 24 is formed on the substrate 22 located on the side of the liquid crystal panel 12. The transparent electrode 24 is formed on one of the surfaces of the substrate 22 that is opposite to the liquid crystal panel 12. The size of the transparent electrode 24 is substantially the same as that of the substrate 22. Reflecting electrodes 25, the number of which is the same as that of the scanning electrodes 17, are formed on the surface of the other substrate 23 facing the transparent electrode 24. The reflecting electrodes 25 extend parallel to the scanning electrodes 17. Each reflecting electrode 25 vertically overlaps one of the scanning electrodes 17 as viewed in FIG. 1. In the preferred embodiment, the transparent electrode 24 serves as a cathode and the reflecting electrodes 25 serve as anodes. The substrates 22, 23 are made of glass. The transparent electrode 24 is made of indium-tin oxide. The reflecting electrodes 25 are made of metal such as chrome and reflect light.

An organic EL layer 26 is located between the substrates 22, 23. The organic EL layer 26 consists of a hole injection layer, a light-emitting layer, and an electron injection layer in this order from the side close to the reflecting electrodes 25. The size of the organic EL layer 26 is substantially the same as that of the transparent electrode 24. Portions of the organic EL layer 26 where the transparent electrode 24 and the reflecting electrodes 25 vertically overlap constitute self-luminous bodies, which are organic EL elements 27. Since the organic EL layer 26 is a thin film, the organic EL elements 27, which are portions of the organic EL layer 26, are also thin films.

The number of the organic EL elements 27 is the same as the number of the reflecting electrodes 25 and the number of the pixel rows. The organic EL elements 27 extend parallel to the lengthwise direction of the scanning electrodes 17 and the pixel rows. Each organic EL element 27 vertically overlaps one of the scanning electrodes 17 and one of the pixel rows. Each organic EL element 27 emits white light in accordance with voltage applied to the transparent electrode 24 and the corresponding reflecting electrode 25. The light emitted from one of the organic EL elements 27 is radiated toward the pixel row that vertically overlaps the organic EL element 27. Each organic EL element 27 flashes independently from the other organic EL elements 27.

The peripheries of the substrates 22, 23 are sealed with a sealing member (such as epoxy resin), which is not shown, to prevent water, oxygen, or the like from entering the organic EL layer 26 from the outside. Absorbing agent for absorbing water and oxygen is located inside the sealed space.

Figure 2:
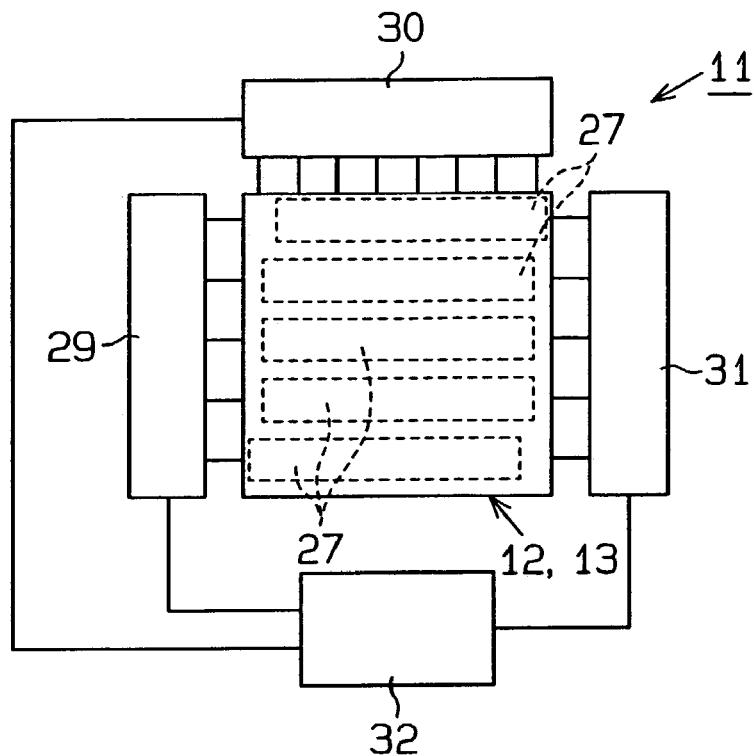
FIG. 2 is a schematic diagram illustrating the entire liquid crystal display.

As shown in FIG. 2, the liquid crystal display 11 further has a scanning electrode driver 29, a data electrode driver 30, a reflecting electrode driver 31, and a controller 32. The scanning electrode driver 29 sequentially selects one of the scanning electrodes 17 and applies voltage to the selected scanning electrode 17. The data electrode driver 30 applies voltage to each data electrode 20 as required while voltage is applied to one of the scanning electrodes 17. The reflecting electrode driver 31 applies voltage to each reflecting electrode 25 in synchronization with the application of voltage to the corresponding scanning electrode 17 that vertically overlaps the reflecting electrode 25. The controller 32 controls the operations of the drivers 29 to 31.

The operations of the liquid crystal display 11 structured as above will now be explained.

The pixels of the liquid crystal panel 12 are activated per pixel row. To activate the pixel rows, the scanning electrode driver 29 sequentially applies voltage to the scanning electrodes 17. When voltage is applied to one of the scanning electrodes 17, the data electrode driver 30 applies a predetermined voltage to the data electrode 20 that corresponds to the pixel to be activated. As a result the pixel is activated. When voltage is applied to one of the scanning electrodes 17, the reflecting electrode driver 31 applies a predetermined voltage to the reflecting electrode 25 that vertically overlaps the scanning electrode 17. As a result, the organic EL element 27 that corresponds to the reflecting electrode 25 to which voltage is applied emits white light. The light emitted from the organic EL element 27 is radiated at the pixel row that vertically overlaps the organic EL element 27, that is, the pixel row that is activated in synchronization with the organic EL element 27.

The scan time of the scanning electrodes 17 is set such that the time required for one scan is so short (30 msec or less) that human does not recognize that the light is flashing. Accordingly, voltage is sequentially applied to the reflecting electrodes 25 in the same cycle. The applied time of voltage to each reflecting electrode 25 is the same as the applied time of voltage to one of the scanning electrodes 17.

Light that is emitted from the organic EL element 27 and radiated at the pixel row passes through the pixel row and is transmitted through red (R), green (G), and blue (B) pixels (not shown) of the color filter 19. Thus, the light is changed into the corresponding color. A desired color is obtained by changing the combination of the red (R), green (G), and blue (B) pixels.

The preferred embodiment provides the following advantages.

(1) Each organic EL element 27 flashes independently from the other organic EL elements 27 to radiate light at the pixel row that is activated in synchronization with the organic EL element 27. Thus, the power consumption is reduced as compared to a case in which the entire backlight 13 is always lighted when the liquid crystal display 11 is used.

(2) The light emitted from the one of the organic EL elements 27 is radiated at the pixel row that is activated in synchronization with the light emission of the organic EL element 27. On the other hand, light is not radiated at the pixel rows that are not activated in synchronization with the light emission of the organic EL element 27. This improves the contrast of an image indicated by the liquid crystal display 11.

(3) The timing of applying voltage to each reflecting electrode 25 is the same as the timing of applying voltage to the corresponding scanning electrode 17. This simplifies adjusting the timing of applying voltage to each reflecting electrode 25.

(4) The backlight 13 uses thin-film organic EL elements 27 as the light source. Thus, as compared to a conventional backlight in which a cold cathode tube and an optical waveguide are combined, the backlight 13 is thin. This contributes for reducing the thickness of the liquid crystal display 11.

(5) The power consumption of the organic EL elements 27 per the same light amount is less than that of the inorganic EL elements. Therefore, as compared to a liquid crystal display in which inorganic EL elements are used as the light source, the power consumption of the liquid crystal display 11 is reduced. Also, the material of the organic EL element has more variation than that of the inorganic EL element. This provides high flexibility of selecting EL material.

(6) The reflecting electrodes 25 are arranged opposite to the liquid crystal panel 12 with respect to the organic EL layer 26. Therefore, light that is emitted from the organic EL elements 27 and leaks toward the substrate 23 is reflected toward the liquid crystal panel 12 by the reflecting electrodes 25. Thus, the amount of light emitted from the backlight 13 toward the liquid crystal panel 12 is increased.

(7) Since the color of light emitted from the organic EL elements 27 is white, three primary colors are obtained by the color filter 19, which has a simple structure. If the color of light emitted from the organic EL elements 27 is other than white such as blue, the structure for obtaining the three primary colors will be more complicated than that of the color filter 19.

It should be apparent to those skilled in the art that the present invention may be embodied in many other specific forms without departing from the spirit or scope of the invention. Particularly, it should be understood that the invention may be embodied in the following forms.

Instead of applying voltage to each reflecting electrode 25 in synchronization with application of voltage to the corresponding scanning electrode 17, voltage may be applied to each reflecting electrode 25 and the adjacent reflecting electrodes 25. In this case also, the power consumption is reduced as compared to a structure in which the entire organic EL elements 27, which constitute the backlight 13, emit light. When applying voltage to the reflecting electrodes 25 the number of which is n, the applied time of voltage to each reflecting electrode 25 is desired to be n times the applied time of voltage to each scanning electrode 17.

When applying voltage to the reflecting electrodes 25, which are formed corresponding to the scanning electrodes 17, in synchronization with application of voltage to the scanning electrodes 17, the number of reflecting electrodes 25 to which voltage is applied simultaneously need not be constant. Instead, the number of reflecting electrodes 25 to which voltage is applied may be varied. In this case, a user can change the brightness of the image to be displayed by the liquid crystal display 11 by changing the number of reflecting electrodes 25 to which voltage is applied according to the environment.

Figure 3:
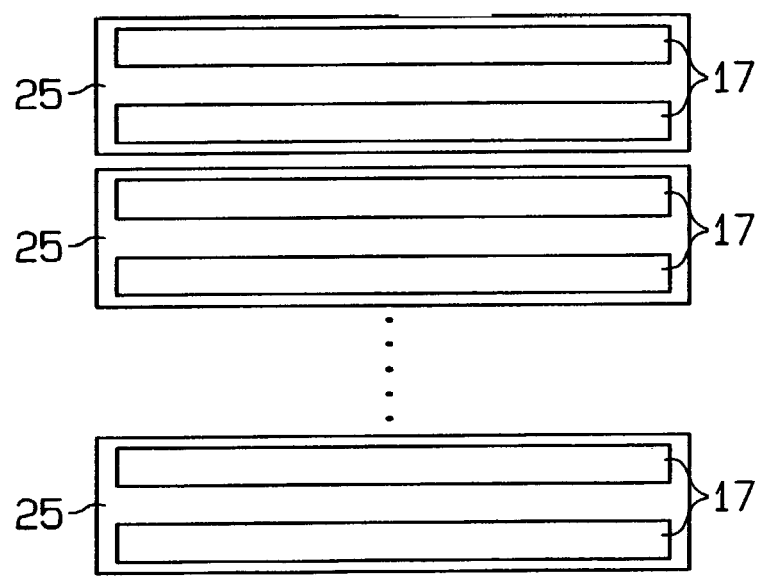
FIG. 3 is a schematic view illustrating the location of scanning electrodes and reflecting electrodes according to a modified embodiment.

Width of each reflecting electrode 25 need not be a predetermined width that corresponds to one of the scanning electrodes 17. Instead, the width of each reflecting electrode 25 may be multiplied such that one organic EL element 27 corresponds to several pixel rows. Each organic EL element 27 emits light (lighted-on) in synchronization with the activation of the corresponding pixel rows. For example, as shown in FIG. 3, in a case in which each reflecting electrode 25 has a width corresponding to two scanning electrodes 17, voltage is applied to each reflecting electrode 25 in synchronization with the corresponding scanning electrodes 17 for the applied time that is double the applied time to one of the scanning electrodes 17. In a case when each reflecting electrode 25 has the width corresponding to the scanning electrodes 17, the number of which is n, voltage is applied to each reflecting electrode 25 in synchronization with the corresponding scanning electrodes 17 for the applied time that is n times the applied time to one of the scanning electrodes 17. In this case also, the power consumption is reduced as compared to a case in which the entire organic EL elements 27, which constitute the backlight 13, simultaneously emit light.

In the structure in which the width of each reflecting electrode 25 is n times the predetermined width that corresponds to one of the scanning electrodes 17 and each organic EL element 27 corresponds to several pixel rows, the applied time to each reflecting electrode 25 need not be n times the applied time per each scanning electrode 17. For example, the applied time may be longer than n times the applied time per each scanning electrode 17, and the applied times of two reflecting electrodes 25 may overlap each other.

The number of reflecting electrodes may be changed as long as there are two or more reflecting electrodes 25. The power consumption is reduced by providing a structure in which voltage is applied to one of the reflecting electrodes 25 that corresponds to the scanning electrode 17 to which voltage is being applied.

The width of each reflecting electrode 25 need not be the same and reflecting electrodes 25 having different widths may be mixed.

The organic EL elements 27 need not extend parallel to the lengthwise direction of the scanning electrodes 17.

The present invention may be applied to a liquid crystal display that includes a portion that always displays an image when power is on and a portion that displays an image under predetermined conditions. In this case, the organic EL element 27 that corresponds to the portion that always displays an image preferably emits light whenever power is on. The other organic EL element 27 that corresponds to the portion that displays an image on demand preferably emits light only when an image is displayed.

The electrode located opposite to the liquid crystal panel 12 with respect to the organic EL layer 26 may be formed of transparent electrodes instead of the reflecting electrodes 25.

The substrates 14, 15, 22, and 23 need not be made of glass. The substrates 14, 15, 22, and 23 may be formed of transparent resin substrates or films.

The substrate 23 need not be transparent. The substrate 23 may be made of hard material such as metal, ceramics, and the like, or may be made of a flexible substrate such as resin.

The organic EL elements 27 need not emit white light. Instead, the organic EL elements 27 may emit blue light. In this case, the color filter 19 is replaced with a color conversion layer that emits fluorescence using blue light as the excitation light source.

The organic EL elements 27 may be replaced with inorganic EL elements. Alternatively, the organic EL elements 27 may be replaced with self-luminous bodies other than EL elements. When the organic EL elements are replaced with inorganic EL elements, protecting means for protecting the organic EL elements 27 from water and oxygen is unnecessary.

The liquid crystal panel 12 may be a black-and-white display panel that has no color filter 19.

Linear transparent electrode (anode) may be formed corresponding to the scanning electrodes 17 on the side of the substrate 22, and electrodes (cathode) having substantially the same shape as the substrate 23 may be formed on the side of the substrate 23.

A semi-transmissive reflecting plate may be located between the scanning electrodes 17 and the backlight 13. In this case, light that is reflected by the reflecting plate and light of the backlight serve as the light source of the liquid crystal display. Thus, required amount of light is obtained although the amount of light of the backlight is reduced. Accordingly, the power consumption is further reduced.

The self-luminous bodies that constitute the backlight 13 need not be the EL elements. The self-luminous bodies may be anything that can be made into a thin film and emit light when voltage or current is applied.

Therefore, the present examples and embodiments are to be considered as illustrative and not restrictive and the invention is not to be limited to the details given herein, but may be modified within the scope and equivalence of the appended claims.

The invention claimed is:

1. A liquid crystal display, the display comprising:
   a liquid crystal panel having a plurality of pixel rows, each of which includes a plurality of pixels, wherein the liquid crystal panel has a plurality of scanning electrodes and a plurality of data electrodes, which extend in directions to intersect each other, and wherein each pixel is formed at the intersecting portion of one of the scanning electrodes and one of the data electrodes, and each pixel is driven in accordance with the voltage applied to the corresponding scanning electrode and the corresponding data electrode; and
   a backlight located at the rear of the liquid crystal panel, wherein the backlight includes a plurality of thin-film organic electroluminescent elements, which extend along the lengthwise direction of the scanning electrodes, wherein each organic electroluminescent element emits white light independently from the other organic electroluminescent elements, and each organic electroluminescent element corresponds to at least one of the scanning electrodes, and wherein light emitted from one of the organic electroluminescent elements is radiated at a pixel row that is activated in synchronization with the light emission of the organic electroluminescent element.

2. The liquid crystal display according to claim 1, wherein each organic electroluminescent element corresponds to at least one of the pixel rows and radiates light toward the corresponding pixel row.

3. The liquid crystal display according to claim 2, wherein the number of pixel rows is the same as the number of the organic electroluminescent elements.

4. The liquid crystal display according to claim 2, wherein the number of pixel rows is the number of the organic electroluminescent elements multiplied by a whole number.

5. The liquid crystal display according to claim 2, wherein the organic electroluminescent elements extend along the lengthwise direction of the pixel rows.

6. The liquid crystal display according to claim 1, wherein the liquid crystal panel is a transmissive liquid crystal display type.

7. The liquid crystal display according to claim 1, wherein the liquid crystal panel includes a pair of opposing transparent substrates between which the plurality of pixels are disposed.

8. The liquid crystal display according to claim 7, wherein the backlight includes another pair of opposing transparent substrates between which the organic electroluminescent elements are disposed.

9. The liquid crystal display according to claim 7, wherein the liquid crystal panel includes at least one polarizing plate disposed between the transparent substrates and the backlight.

10. The liquid crystal display according to claim 1, wherein the backlight includes a pair of transparent substrates between which the organic electroluminescent elements are disposed.

11. The liquid crystal display according to claim 1, wherein the liquid crystal panel includes at least one transparent substrate through which light from the backlight must pass to enter the liquid crystal display.

12. The liquid crystal display according to claim 1, wherein the liquid crystal panel includes a pair of opposing transparent substrates between which the electrodes of the liquid crystal panel are disposed.

13. The liquid crystal display according to claim 1, wherein the backlight includes a pair of opposing transparent substrates between which the plurality of thin-film organic electroluminescent elements are disposed.

14. The liquid crystal display according to claim 1, wherein all of the electrodes in the liquid crystal panel are transparent.

15. The liquid crystal display according to claim 1, wherein the backlight includes a transparent electrode and a reflective electrode between which the organic electroluminescent elements are disposed, wherein the reflective electrode is one of a plurality of reflective electrodes, and wherein at least one of the reflective electrodes has different width from another one of the reflective electrodes.

16. The liquid crystal display according to claim 1, wherein the backlight includes a transparent electrode and a reflective electrode between which the organic electroluminescent elements are disposed, wherein the reflective electrode is one of a plurality of reflective electrodes, and wherein the number of reflective electrodes to which voltage is applied in synchronization with application of voltage to each of the scanning electrodes is variable.

17. The liquid crystal display according to claim 1, wherein the liquid crystal panel includes a color filter, wherein light that is emitted from the backlight and is passed through the pixels is transmitted through the color filter.

* * * * *